April 7, 1970  E. M. TRAMMELL, JR  3,504,830

LITTER DISPOSAL UNIT IN AN AUTOMOBILE ASSEMBLY

Filed Jan. 17, 1969

Inventor
EARL M. TRAMMELL, JR.

Cohn and Powell
By
Attorneys

One United States Patent Office 3,504,830
Patented Apr. 7, 1970

3,504,830
LITTER DISPOSAL UNIT IN AN AUTOMOBILE ASSEMBLY
Earl M. Trammell, Jr., 39 Salem Estates,
Ladue, Mo. 63124
Continuation-in-part of application Ser. No. 724,509,
Apr. 26, 1968. This application Jan. 17, 1969, Ser.
No. 791,940
Int. Cl. B60n 3/08
U.S. Cl. 224—29                    16 Claims

ABSTRACT OF THE DISCLOSURE

A utility device, such as a litter container or the like, is held against either the front or rear sides of the automobile front seat that is selectively adjustable in position forwardly or rearwardly. A mounting means includes a substantially L-shaped container frame for holding the container. A fitting is slidably adjustable along an upstanding rod portion of the L-shaped container frame to locate an elongate arm attached to the fitting, up against the underside of the seat. The fitting is selectively attachable in predetermined, adjusted position on the container frame to accommodate the underseat height. This fitting rigidly interconnects the container frame and the rearwardly extending arm to preclude tilting of the container and container frame when urged against the seat side under loading of a resilient means.

CROSS REFERENCE TO RELATED APPLICATION

This application is a continuation-in-part of application Ser. No. 724,509, filed Apr. 26, 1968.

BACKGROUND OF THE INVENTION

This invention relates generally to improvements in a litter disposal unit in an automobile seat assembly, and more particularly to an improved means for mounting such container to a forwardly or rearwardly adjustable front seat. The container can hold litter, driving accessories or any convenience items.

The heretofore conventional litter containers have either incorporated a gravity fit such as the common placement of a container across the transmission hump on the front seat floor, or have employed attaching means for the litter container to the dashboard, kick pad, etc. of the automobile. These latter means of attachment necessitated different fixtures for each make of automobile. Also, both the gravity and fixed positions mentioned served to interfere at times with the movement of the driver and passenger. Litter containers have also been made in one piece with an integral hook that hooks under the front seat of an automobile to maintain a fixed position against the lower portion of the front seat. This is a desirable location since it is both accessible and out of the way of the occupants. However, there has been no general acceptance to date of this hook design since it is limited in practical attachment to the varying underseat structure.

Those devices which could be hung from internal projections were usually constructed inexpensively of paper so that they could be thrown away when filled and consequently were not readily available when a supply was depleted. Moreover such containers are not convenient because they obstruct the use of the mounting projection and were usually located in an area where they interfered with the driver's or passenger's movements and actions.

Those containers which rested on the seat took up seating room and diminished the occupant's comfort.

Those containers that rested on the flood hindered the movement of the occupant's legs and were not always in the optimum position for usage, especially when utilized in conjunction with a movably mounted automobile front seat.

There are no general containers of this type that can be installed with a seat assembly as an accessory, at minimal expense and yet achieve the desired functional advantages.

SUMMARY OF THE INVENTION

The present litter container is attached to an automobile seat at either the front or rear sides by a special mounting means. At the front of the seat, the container is located under the occupant's legs near the floor so that the container does not hamper the movement of the occupant. At either the front or rear side of the seat, the container will be in a relatively concealed position, yet will be relatively available for usage. The container does not occupy important and otherwise usable seat or floor space.

This invention positions the litter container in this convenient position by new attachment means which permit practical and easy installation on a front seat structure of any automobile including those with power seats. It provides a pressure fit against the front seat regardless of the structure variance that exists from one make of automobile to another.

The litter disposal unit, including the unique mounting means, is simple and durable in construction, and inexpensive to manufacture and assemble. It can be quickly and easily installed in any automobile by anyone without the need for any complicated instructions or special tools. Accordingly, the unit is one that can be sold as an accessory and can be readily installed by the average automobile owner or user.

Because the litter container is retained to the seat side by the mounting means, the container will be carried by the seat during selective adjustment of the seat position, and will therefore be maintained in the appropriate location at all times.

The mounting means includes a substantially L-shaped container frame, having a substantially upstanding rod portion and an integral bottom rod portion, holding the container. A fitting is slidably adjustable along the upstanding rod portion. An elongate arm is attached to the fitting and is adapted to extend under and against the underside of the seat. The fiting is fixed in a predetermined adjusted position along the upstanding rod portion of the container frame to accommodate the underseat height. A spring located about the elongate arm has one end attached to the container frame and has the other end attached by a flexible wire to a fixed member of the seat assembly, the spring holding the container frame, and hence the container connected to the frame, against the front side of the seat and adjacent the floor. The slidable fiting provides a rigid connection between the container frame and elongate arm that holds the container frame in the desired position at all times for ready attachment and detachment of the container, and precludes tilting of the container frame and the container held by such frame

DESCRIPTION OF THE PREFERRED EMBODIMENT

Figure 1:
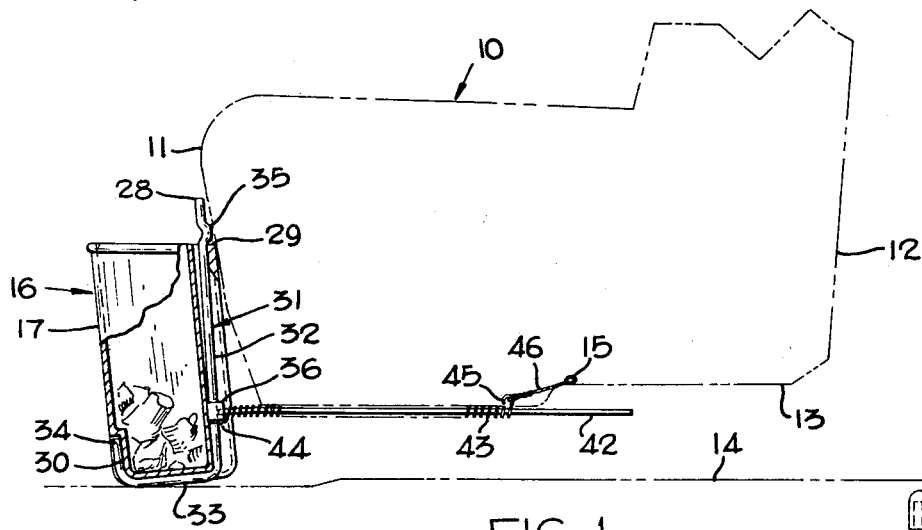
FIG. 1 is a side elevational view partly in cross section showing the litter disposal unit in an automobile seat assembly.
Figure 2:
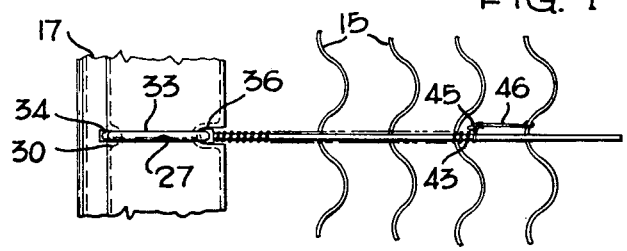
FIG. 2 is a fragmentary, bottom plan view of the assembly shown in FIG. 1.

Referring now by characters of reference to the drawing, and first to FIG. 1, it will be understood that the seat assembly includes an automobile front seat 10 having a front side 11 and a rear side 12. As is usual, the bottom 13 of seat 10 is spaced slightly above the floor 14. The bottom 13 of seat 10 is provided with a plurality of transverse, supporting members, one of which is shown in FIG. 1, and a plurality of which are illustrated in FIG. 2, constituting a fixed member of the seat. Although not shown, it will be readily understood that the automobile front seat 10 can be selectively adjusted forwardly or rearwardly by suitable conventional mechanism.

Figure 3:
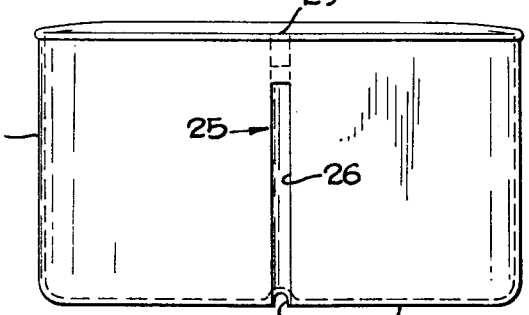
FIG. 3 is a rear, elevational view of the container.
Figure 4:
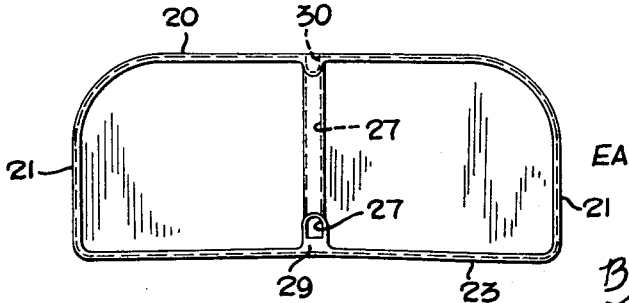
FIG. 4 is a top, plan view of the container.

The litter disposal unit generally indicated by 16, includes a container 17, the structure of which is best shown in FIGS. 1, 3, and 4. The container is preferably constructed of a plastic material. The container 17 includes a front wall 20, rounded at the corners and merging with side walls 21 to join with a flat, rear wall 23. The container includes a bottom wall 24.

The container 17 is provided with a substantially L-shaped groove referred to by 25. The L-shaped groove 25 includes an upstanding groove portion 26 in the container rear wall 23, a bottom groove portion 27 in the container bottom wall 24 and an upturned groove portion 30 in the container front wall 20.

Extending across the top of the upstanding groove portion 26 and forming a part of the container top, is a ledge 29, the purpose of which will be described upon later detailed description of parts. The L-shaped groove 25 consists of continuous groove portions 26, 27 and 30 and is relatively narrow.

The mounting means for the container 17 includes a substantially L-shaped container frame referred to by 31. The frame 31 includes an upstanding rod portion 32, an integral lower rod portion 33 and an integral upturned rod portion 34. The upstanding rod portion 32 interfits the upstanding groove portion 26 formed in the container rear wall 23. The lower rod portion 33 interfits the bottom groove portion 27 in container bottom wall 24, and the upturned front rod portion 34 interfits the upturned groove portion 30 in the container front wall 20.

The upper end of the rod portion 32 extends above the top of container 17 and forwardly of ledge 29. As will later appear, the upstanding rod portion 32 engages the ledge 29 and presses the top of container 17 tightly against the front side 11 of seat 10 when the litter disposal unit 16 is assembled to the seat 10. In the embodiment of FIG. 1, the upper end 28 of upstanding rod portion 32 is provided with a formed projection 35 that engages and seats on the top of container ledge 29 to hold the container frame 31 and container 17 in assembly. Of course, the rod projection 35 can be simply disengaged to permit detachment of the container 17 from the frame 31 as will later appear.

The lower rod portion 33 extends slightly of its compatible bottom groove portion 27 and slightly below the bottom wall 24 of container 17 to slidably engage the floor 14. When assembled, the rod portion 32 is slightly inclined with respect to the vertical, while the lower rod portion 33 is inclined upwardly and rearwardly so that the frame 31 and the container 17 can slide easily over and on the floor 14.

Figure 6:
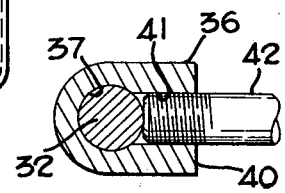
FIG. 6 is an enlarged cross sectional view taken on line 6—6 of FIG. 5.

Slidably mounted on the container frame, and specifically on the upstanding rod portion 32, is a fitting 36, the structure of which is best shown in FIG. 6. This fitting 36 includes a bore 37 that slidably receives the upstanding rod portion 32. Formed in the rear side 40 of fitting 36 is a threaded aperture 41 that communicates with the bore 37. For reasons which will later appear, the axis of threaded aperture 41 is located at a slight angle with respect to the axis of bore 37. The fitting 36 is slidably movable and adjustable to predetermined positions along the length of the rod portion 32 to accommodate the particular underseat height.

An elongate arm 41 is threadedly attached to the fitting 36 in the threaded aperture 41. The arm 42 extends rearwardly under the seat 10 and against the seat bottom 13. The fitting 36 is slidably moved on the rod portion 32 of container frame 31 to permit this location of arm 42, while the lower rod portion 33 engages the floor 14. Then, the arm 42 is threadedly tightened in its aperture 41 until the arm end engages the rod portion 32 in the fitting bore 37, thereby clamping the fitting 36 tightly in position on the rod portion 32 of the container frame 31.

Located on and about the arm 42 is a tension spring 43 constituting a resilient means. One end 44 of spring 43 is hooked about the rod portion 32 below the fitting 36. The opposite spring end 45 is hooked to a flexible wire 46, the wire 46 being wrapped around and connected to one of the transverse seat members 15, the wire 46 and seat member 15 constituting an anchorage means. The spring 43 is never allowed to extend beyond the end of the arm 42 in order to provide complete installation rigidity and maintain the arm 42 snug against the seat bottom 13. When so attached, the loading of spring 43 exerts a pull on the container frame 31 and urges the container 17 against the front side 11 of seat 10.

Figure 5:
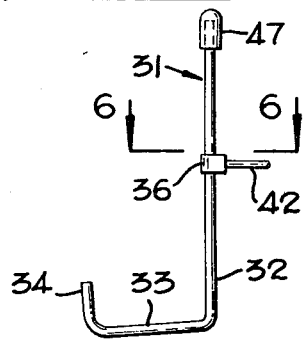
FIG. 5 is a side elevational view of the container frame, slightly modified.

FIG. 5 illustrates a container frame 31 that is slightly modified from that illustrated in FIG. 1. Instead of an integral projection formed on the end 28 of the upstanding rod portion 32, a metal or plastic cap 47 is attached to the rod end 28. The cap 47 provides a shoulder that engages and seats on the container ledge 29 and tends to hold the container 17 in connection with the container frame 31. In this sense, the cap 47 provides the same function as the projection 35. In addition, the cap 47 provides a convenient finger grip that can be utilized to disengage the cap 47 from the ledge 29 upon withdrawing the container 17 from the frame 31.

It is thought that the functional advantages of the litter disposal unit 16 have become fully apparent from the foregoing, detailed description of parts, but in order to provide a full disclosure, the installation and usage will be briefly described.

The litter disposal unit 16 can be quickly and easily installed in the seat assembly. It will be assumed that the tension spring 43 has been fitted over the arm 42 and that the spring end 44 has been attached to the fitting 36 attached to the end of arm 42. The container frame 31 is located in an upright position as shown in FIG. 1 with the lower rod portion 33 seating on the floor 14 and the upstanding rod portion 32 held against the front seat side 11. The fitting 36 is slidably moved upwardly on the rod portion 32 until the arm 42 bears against the bottom 13 of seat 10. When the underneath height of the seat 10 has been accommodated in this manner, the arm 42 is threadedly tightened in the fitting 36 in order to engage the rod portion 32 located in the fitting bore 37, thereby clamping the fitting 36 to the rod portion 32 in the adjusted position. The spring end 45 is pulled rearwardly by the wire 46 to tension spring 43, and the wire 46 is wrapped around any one of the suitable fixed members 15 located in its vicinity on the bottom 13 of seat 10 to hold the spring 43 under tension.

To attach the container 17 to the container frame 31, the container 17 is simply slipped down into the frame 31 so that the upstanding rod portion 32 interfits the groove portion 26, the lower rod portion 33 interfits the bottom groove portion 27 and the upturned rod portion 34 interfits the upturned grove portion 30. In installing the container 17, the upper rod end 28 moves upwardly in front of the container ledge 29 and above such ledge 29. The rod projection 35 in the embodiment of FIG. 1 or the cap 47 in the embodiment of FIG. 5 snaps over the container ledge 29 to hold the container 17 in place. The resilient loading of spring 43 causes the container frame 31 to press the top of the container 17 against the front seat side 11.

Even though the bottom of the front seat side 11 is usually cut back at an angle, the container frame 31 and the container 17 are not tilted under the loading of spring 43 because of the rigid connection provided by fitting 36 between the rod portion 32 and the rod arm 42, and because of the engagement of the arm 42 with the bottom 13 of seat 10.

Upon changing the position of seat 10 either forwardly or rearwardly, the container 17 will be held firmly against the front seat side 11 at all times. The inclined disposition of the lower rod portion 33 enables such rod portion 33 to ride easily on the floor 14 and accommodate any irregularities encountered. It will be noted that the location of the container 17 on the floor 14 at the bottom portion of the front seat side 11 is under the occupant's legs, completely out of the way and at least partially concealed.

If it is desired to empty the container 17, the occupant merely reaches down to grip the rod end 28 or cap 47 and pulls the container frame 31 slightly forward in order to clear the rod projection 35 or cap 47 from the container ledge 29. The container 17 can then be gripped and simply lifted upwardly clear of the container frame 31. The container frame 31 will remain in its operative position held tightly against the front seat side 11 while the container 17 is emptied and will remain in this operative position ready to accommodate the container 17 upon replacement. The attachment of the container 17 to the container frame 31 has been previously described.

The litter disposal unit 16 can be similarly attached to the seat 10 so that the container 17 and container frame 31 bear against the rear seat side 12. The attachment of the mounting means to the seat 10 is the same as that previously described. The container 17 can be attached to the frame 31, removed and subsequently reattached in the same way. The only difference is that the container 17 is located at the rear of the front seat 10.

I claim as my invention:

1. A litter disposal unit for attachment to an automobile seat, comprising:
    (a) a container, and
    (b) mounting means connected to the container, the mounting means including:
        (1) an elongate arm adapted to extend under and against the underside of the seat,
        (2) an adjustable connection between the container and the arm to accommodate the underseat height, and
        (3) resilient means tending to urge the container against one side of the seat.

2. A litter disposal unit as defined in claim 1, in which:
    (c) the mounting means includes a substantially L-shaped container frame, having a substantially upstanding rod portion and an integral bottom rod portion, holding the container,
    (d) the adjustable connection includes a fitting slidably adjustable along the substantially upstanding rod potrion to accommodate the underseat height, and
    (e) the elongate arm is attached to the fitting.

3. A litter disposal unit as defined in claim 2, in which:
    (f) the fitting engages a length of the substantially upstanding rod portion of the substantially L-shaped container frame to provide a force couple precluding tilting of the container and container frame when urged against the seat side.

4. A litter disposal unit as defined in claim 3, in which:
    (g) the fitting has a sleeve portion slidably receiving the upstanding rod portion of the container frame, and
    (h) means selectively attaches the sleeve portion to the rod portion at a predetermined adjusted position.

5. A litter disposal unit as defined in claim 3, in which:
    (g) the fitting includes a sleeve portion provided with a bore in which the upstanding rod portion of the container flange is slidably received,
    (h) the fitting is provided with a threaded aperture in its side, communicating with the bore, and
    (i) the elongate arm is threadedly attached to the fitting in the aperture and clamps the fitting to the upstanding rod portion in adjusted position.

6. A litter disposal unit as defined in claim 3, in which:
    (g) the container is provided with a substantially L-shaped groove having groove portions in its back and bottom walls to receive the substantially L-shaped container frame, the groove portion in the container back wall being open rearwardly to enable the slidable adjustment of the fitting on the upstanding rod portion of the container frame received in the back wall groove portion while the elongate arm is attached to the fitting.

7. A litter disposal unit as defined in claim 6, in which:
    (h) the container includes a ledge overlapping the back wall groove portion, and
    (i) the upstanding rod portion of the container frame engages the ledge of the container to hold the container against the seat side.

8. A litter disposal unit as defined in claim 6, in which:
    (h) the substantially L-shaped container frame includes an upturned front rod portion,
    (i) the container groove includes a groove portion in its front wall receiving the upturned front rod portion,
    (j) the container includes a ledge overlapping the back wall groove portion adjacent the top of the container, and
    (k) the upstanding rod portion of the container frame engages the ledge and the upturned front rod portion engages the container adjacent the bottom of the container, to hold the container against the seat side.

9. A litter disposal unit as defined in claim 8, in which:
    (l) means on the upstanding rod portion of the container frame engages the ledge to hold the container to the container frame.

10. A litter disposal unit as defined in claim 3, in which:
    (g) the resilient means is a spring located about the elongated arm, the spring having one end attached to the container frame, and
    (h) a flexible wire is attached to the other spring end and adapted for selective connection to a fixed member under the seat.

11. A litter disposal unit as defined in claim 10, in which:
    (i) the spring, when tensioned, is maintained inwardly of the unattached arm end to assure a snug fit against the seat bottom.

12. A litter disposal unit as defined in claim 3, in which:
    (g) the container includes a continuous, substantially L-shaped groove having an upstanding groove portion in its back wall, a bottom groove portion in its bottom wall and an upturned groove portion in its front wall,
    (h) the container includes a ledge across the upstanding groove portion adjacent the top of the back wall,
    (i) the container frame is received in the groove, the upstanding rod portion interfitting the upstanding groove portion and engaging the container ledge, (j) the frame includes a bottom rod portion interfitting the bottom groove portion, and an upturned rod portion interfitting the upturned groove portion and engaging the front container wall adjacent the bottom wall, and (k) means on the upstanding rod portion engages the top of the ledge to retain the container on the frame.

13. A litter disposal unit as defined in claim 12, in which:

(l) the fitting is provided with a bore in which the upstanding rod portion is slidably received, and is provided with a threaded aperture in its side communicating with the bore and receiving the elongate arm, the elongate arm engaging the upstanding rod portion in the bore to fix the fitting in predetermined adjusted position along the upstanding rod portion of the container frame, and (m) the back wall groove portion is open rearwardly to enable slidable adjustment of the fitting.

14. A litter disposal unit as defined in claim 13, in which:

(n) the resilient means is a spring located about the elongate arm, the spring having one end attached to the container frame, and (o) a flexible wire is attached to the other spring end and adapted for connection to a fixed member under the seat.

15. A litter disposal unit as defined in claim 3, in which:

(g) the elongate arm is substantially horizontal, (h) the upstanding rod portion of the container frame is inclined relative to the elongate arm for holding the top of the container against the seat side, and (i) the bottom rod portion of the container frame is inclined upwardly and rearwardly to ride easily on the floor under the seat.

16. A litter disposal unit as defined in claim 1, in which:

(c) the resilient means is a tension spring located about the arm, the spring having one end fixed relative to the arm, and having the other end adapted for attachment to the seat, and (d) the spring, when tensioned, is maintained inwardly of the unattached arm end to assure a snug fit against the seat bottom.

References Cited

UNITED STATES PATENTS

| | | | |
|---|---|---|---|
| 3,002,665 | 10/1961 | Allen | 224—42.42 |
| 3,252,637 | 5/1966 | Hart | 224—1 |

GERALD M. FORLENZA, Primary Examiner

U.S. Cl. X.R.

206—19.5